(No Model.)
J. KNAPP.
VELOCIPEDE.
No. 400,090.        Patented Mar. 26, 1889.
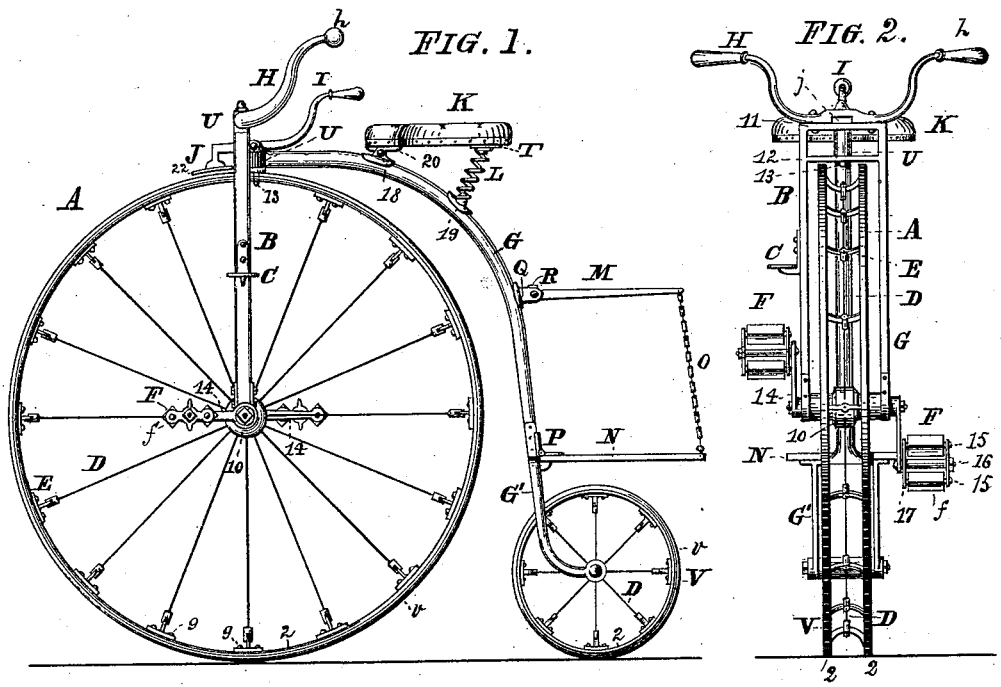
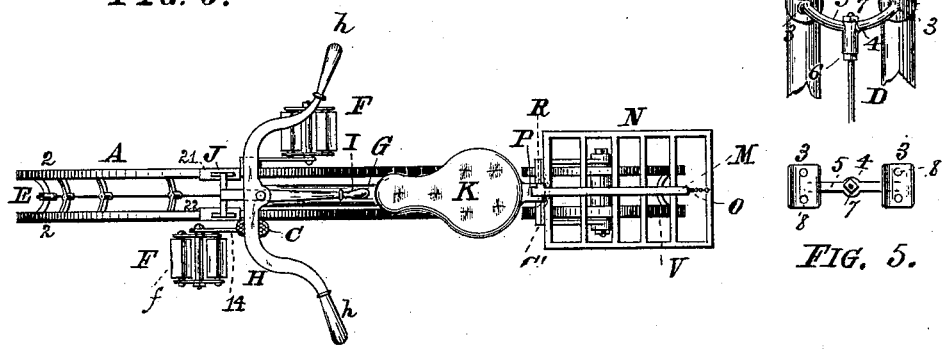
Witnesses:
Wm O. Stark
Timothy Gingras
Inventor:
Joseph Knapp
by Michael J. Stark,
Attorney.

UNITED STATES PATENT OFFICE.

JOSEPH KNAPP, OF BUFFALO, NEW YORK.

VELOCIPEDE.

SPECIFICATION forming part of Letters Patent No. 400,090, dated March 26, 1889.

Application filed January 15, 1889. Serial No. 296,418. (No model.)

*To all whom it may concern:*

Be it known that I, JOSEPH KNAPP, of Buffalo, in the county of Erie and State of New York, have invented certain new and useful Improvements in Wheeled Vehicles; and I do hereby declare that the following description of my said invention, taken in connection with the accompanying sheet of drawings, forms a full, clear, and exact specification, which will enable others skilled in the art to which it appertains to make and use the same.

This invention has general reference to wheeled vehicles, especially that class designated "bicycles" and "tricycles;" and it consists, essentially, in the novel and peculiar combination of parts and details of construction, as hereinafter to be first fully set forth and described, and then pointed out in the claims.

In the drawings already mentioned, which serve to illustrate my said invention more fully, Figure 1 is a side elevation of my improved bicycle. Fig. 2 is a front elevation, and Fig. 3 a plan, of the same. Fig. 4 is an elevation of a portion of the double-rimmed wheel, and Fig. 5 is a plan of the bridge-piece connecting the two rims.

Like parts are designated by corresponding letters of reference in all the figures.

The object of my present invention is the production of a bicycle which shall be capable of standing unsupported in an upright position. It shall, furthermore, be more easily operated by being in more perfect balance and having a broad wheel-base. To reach this end I provide this bicycle with a main or driving wheel, A, of any suitable diameter, said wheel having two rims, 2 2, secured together by means of a series of bridge-pieces, E, connecting said rims with each other, and by the spokes D with the hub 10, as clearly illustrated in the figures. This wheel is fixed upon an axle having its bearings in the lower end of a fork, B, the upper end of which terminates in a cross-piece, 11, while near this upper end there is a connecting-piece, 12, between which two pieces the end U of the backbone G is pivoted by a bolt, 13, as shown in Fig. 2.

To the cross-bar 11 is secured the handle H, having the handles proper, *h*, in the usual manner.

To the axle of the wheel A are secured cranks 14, to which in turn are pivoted the treadles F in the usual manner, said treadles consisting, preferably, of angular rubber blocks revolving upon a central rod, 16, as illustrated in Fig. 2.

To the backbone G is affixed near its forward end a hinge-piece, 18, engaging a similar piece, 20, secured to the seat K, there being, furthermore, secured to said backbone a stud-plate, 19, engaging the lower end of a spiral spring, L, while the upper end engages a stud-plate, T, fastened to the under side of the said seat near its rear end. The seat is carried by the said spiral spring L in a very simple but effective manner.

A suitable distance below the stud-plate 19 there is affixed to the backbone G a double eye, Q, between which is pivoted a suspending-rod, M, having a stop, R, bearing against the upper side of one of the eyes, and thereby keeping it in a horizontal position, said stop, however, not interfering with said rod M, being elevated when desired. The object of this rod is to support a platform, N, hinged to the backbone G at P, said platform consisting of a light lattice-work or frame carried by the chain O and being intended to be used as a parcel-carrier and a step for mounting the bicycle in a manner readily comprehended. The lower end of the backbone is bifurcated at G' and the fork extended backward a suitable distance to receive between them the trailing wheel V, said wheel being constructed with a double rim, &c., precisely the same as the front wheel, A, the details of the construction of which will hereinafter be fully set forth and described.

In the handle H there is centrally an aperture, *j*, Fig. 2, through which is passed the lever I of the brake, the forward end, J, of which is bifurcated and each fork provided with a shoe, 21 and 22, as clearly shown in Figs. 1 and 3, whereby the brake is caused to act upon both rims of the wheel A by lifting the handle I of said brake-lever.

The wheels A and V consist each of two rims, 2 2, as mentioned, connected together at suitable intervals by the bridge-pieces E, consisting each, as shown in Figs. 4 and 5, of two plates, 3 3, connected together by, preferably, curved cross-bar 5, having centrally an eye, 4, through which the spoke D is passed, lock-nuts 6 and 7 being employed on the outer ends of said spokes to tension them and securely fasten the parts in position. The plates 3 have holes 8, by means of which and rivets 9, Fig. 1, they are secured to the rims, but they may be brazed or otherwise secured to the rims when desired. When the rims are not to be tired with a rubber band, they are constructed of flat metal, as shown in Figs. 2 and 3, and the plates 3 3 are arranged accordingly; but when they are to be thus tired with the rubber tires $v\ v$, I prefer to construct the rims 2 2 of semicircular channel-iron, as shown in Fig. 4, so that the rubber tires having a circular cross-section can be sprung into the gutter-like circumference of the rim, and thereby securely retained in position.

The advantages derived from the construction of the bicycle as described are that, the wheels being double-rimmed, the vehicle will stand in an erect position without support, thereby making it much easier to ride, besides presenting other obvious advantages.

In mounting the bicyclist steps with one foot upon the parcel-carrier N, and then mounts the seat K, resting his foot whenever desired upon the laterally-projecting support C on the fork B.

Having thus fully described my invention, I claim as new and desire to secure by Letters Patent of the United States—

1. The double-tired wheel A, having the bridge-pieces E, connecting said rims or tires, said bridge-pieces having the passage for the spokes D, and the hub 10, as and for the purpose set forth.

2. In bicycles and tricycles, a main wheel consisting of two rims connected together by a series of bridge-pieces, a single hub, and spokes, as described, in combination with the fork B, backbone G, seat K, and trailing wheel V, the whole being constructed and combined as and for the purpose set forth.

3. The combination, with the fork B, having cross-pieces 11 12, of the backbone G, pivoted between said cross-pieces, the handle H, having the notch $j$, and the brake-lever I, with fork J and brake-shoes 21 22, as and for the object stated.

4. The combination, with the backbone G, of the parcel-carrier N, hinged to the backbone at P and supported by the supporting-rod M, as and for the purpose mentioned.

5. The combination, with the backbone G, of the hinged parcel-carrier N, supported by the supporting-rod M, having suitable stop, R, engaging the double eye Q, and the chain O, as and for the purpose specified.

6. The bridge-pieces E, as described, consisting of the plates 3 3, cross-piece 5, and central eye, 4, said bridge-piece having the spoke D secured by the locking-nuts 7 8, as and for the purpose set forth.

In testimony that I claim the foregoing as my invention I have hereto set my hand in the presence of two subscribing witnesses.

JOSEPH KNAPP.

Attest:
MICHAEL J. STARK,
WM. O. STARK.